March 2, 1971          A. W. KINNEY          3,566,613

MAINTAINING VOLUME-WEIGHT RELATIONSHIP IN PACKAGING

Filed Feb. 27, 1969          2 Sheets-Sheet 1

INVENTOR.
A. W. KINNEY

BY Young + Quigg

ATTORNEYS

United States Patent Office 3,566,613
Patented Mar. 2, 1971

3,566,613
MAINTAINING VOLUME-WEIGHT RELATIONSHIP
IN PACKAGING
Alfred W. Kinney, Parkville, Mo., assignor to
Phillips Petroleum Company
Filed Feb. 27, 1969, Ser. No. 802,929
Int. Cl. F25c 7/14
U.S. Cl. 62—130                        3 Claims

ABSTRACT OF THE DISCLOSURE

A constant volume of ice cream or similar material is positioned in each of a series of containers. The filled containers are weighed, and a signal is established which is representative of the weight of each container. In response to this signal the density of the product is adjusted so that a predetermined volume-weight relationship is maintained. This can be accomplished by adjusting air introduction to the ice cream freezer, for example.

---

In the manufacture of food products such as ice cream, it is common practice to incorporate air into the mixture in order to produce a product which has a predetermined density. For example, ice cream is usually produced commercially by means of a continuous freezer into which ice cream mix and air are introduced. The amount of air entrained in the frozen product serves to control the density of the ice cream. In the packaging of products of this type, it is usually important to fill the container completely in order to avoid customer complaints. It is also desirable to maintain the density of the product constant in order to maintain uniform consistency and to meet any governmental regulations which may be applicable to the product. Because of these requirements, packaging problems are often encountered. If the only requirement were one of weight, the filled package could be weighed and the volume of material introduced into the packages could be adjusted to maintain a desired weight. One such procedure is described in U.S. Pat. 3,073,400, for example. However, this method is not effective in the bulk packaging of ice cream and the like where it is necessary to maintain the containers full as well as provide a uniform density.

In accordance with this invention, a method is provided for controlling the density of a material being packaged so that the containers can be completely filled and still meet desired weight specifications. This is accomplished by the use of volumetric packaging apparatus to fill the containers completely with product. The resulting containers are then weighed. If the weight of the filled container deviates from the desired value, the density of the product being packaged is adjusted to the extent necessary to maintain the desired weight. In the packaging of ice cream, this adjustment of density can be accomplished by controlling the ratio of air to ice cream mix employed in the manufacture of the ice cream.

Figure 1:
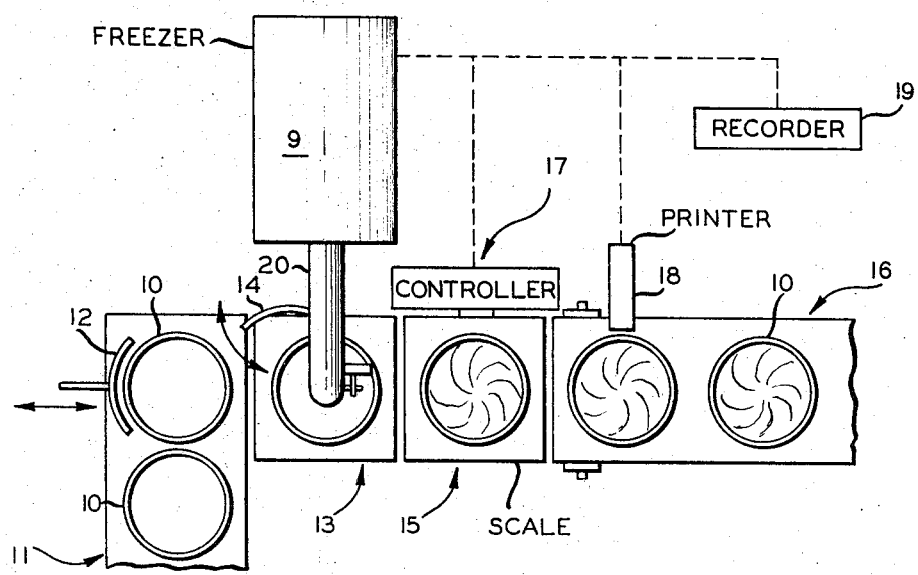
Figure 2:
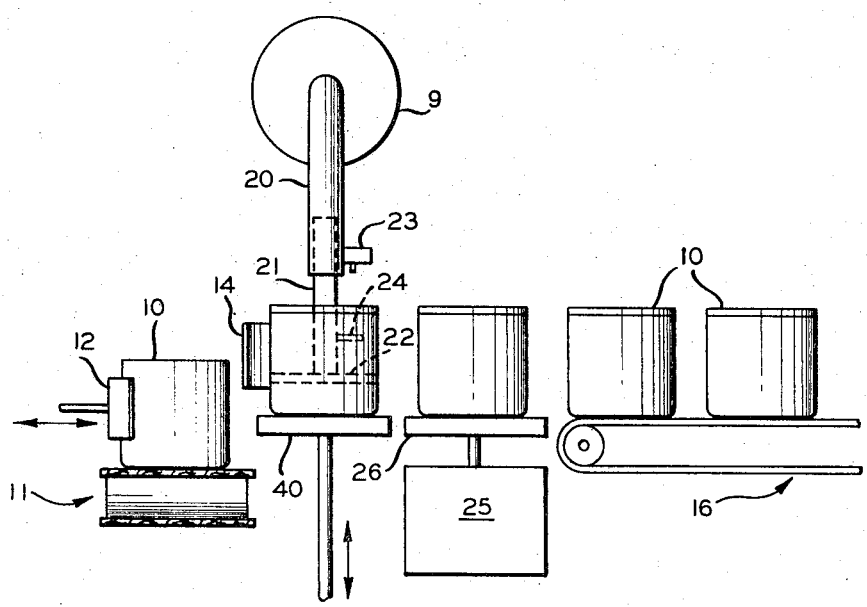
Figure 3:
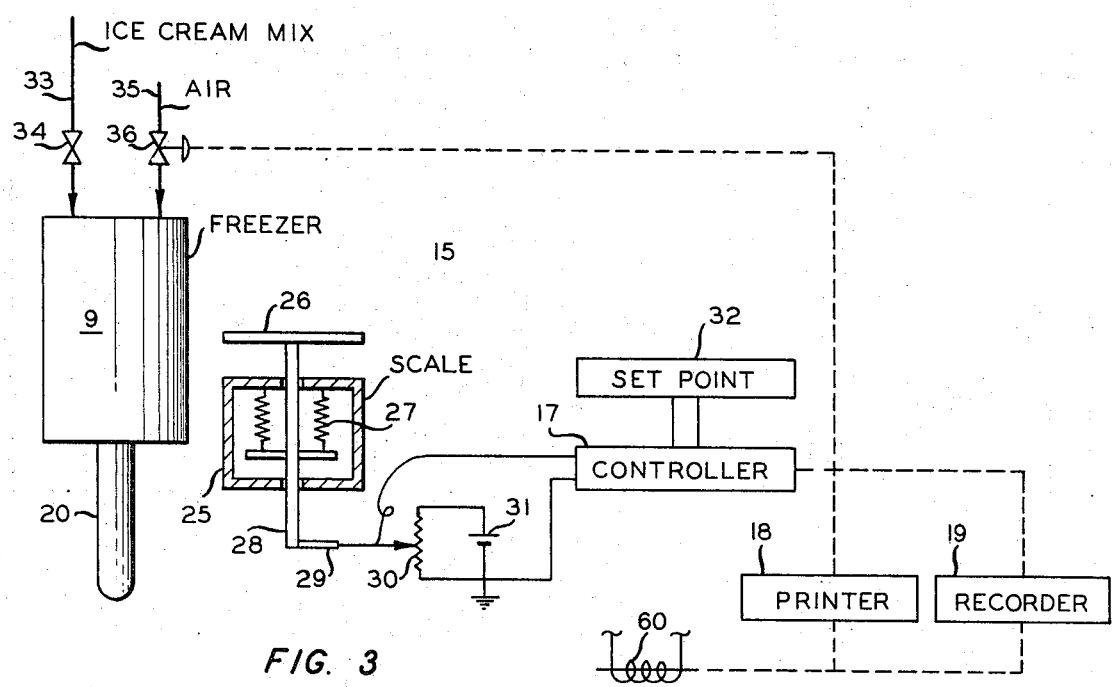
Figure 4:
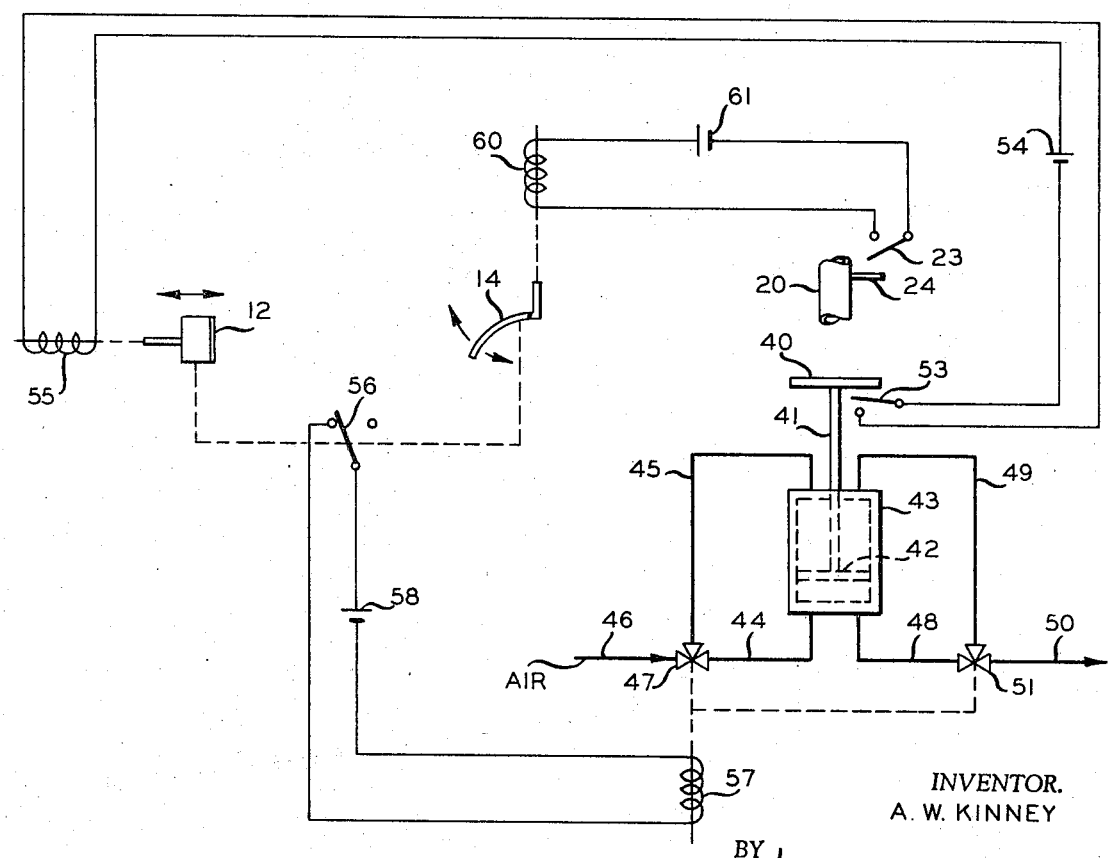

In the drawing; FIG. 1 is a schematic plan view of apparatus employed to carry out the method of this invention in the packaging of ice cream or similar product. FIG. 2 is an elevation view, shown partially in section, of the apparatus of FIG. 1. FIG. 3 is a schematic view of certain control features of the apparatus of FIG. 1. FIG. 4 is a schematic view of additional control features of the apparatus of FIG. 1.

Referring now to the drawing in detail and to FIGS. 1 and 2 in particular, there is illustrated equipment employed to freeze and package ice cream. A continuous freezer 9 combines ice cream mix with air and freezes the resulting mixture to form a semi-frozen product. Empty containers 10 are delivered to the packaging equipment by a first conveyor 11. A reciprocating pusher member 12 is employed to transfer the empty containers from the end of conveyor 11 to a filling station 13. A rotatable transfer member 14 is employed to move filled containers from station 13 to a weighing station 15. The filled containers are subsequently transferred to a second conveyor 16 which removes the filled containers to a cold storage area where the freezing process is completed. Weighing station 15 includes control mechanism which is employed to adjust the density of the product from freezer 9 in the manner to be described hereinafter in greater detail. A printer 18 is provided to add certain identification data to the filled containers. A recorder 19 is provided so that a permanent record of the weights of the filled containers can be maintained.

Freezer 9 is provided with an outlet nozzle 20 which delivers the ice cream to the empty containers at filling station 13. As illustrated in FIG. 2, a movable filling tube 21 depends from nozzle 20 and is provided with a disk 22 at the bottom thereof. This disk rides on the surface of the ice cream as the container is being filled so as to level the surface and insure uniform filling. A limit switch 23 is secured to nozzle 20 so as to be engaged by a rod 24 on tube 21. As described hereinafter in greater detail, this limit switch serves to control the filling and transfer mechanism.

As illustrated in FIG. 3, weighing station 15 is provided with a scale 25 which weighs the filled containers. This scale has a platform 26 on which the container rests. The weight of the container moves platform 26 downwardly against retaining springs 27 by an amount which is representative of the weight of the container. Platform 26 is secured to springs 27 by a support bar 28 which carries a pointer 29 at the lower end. This pointer is connected to the contactor of a potentiometer 30. A voltage source 31 is connected across the end terminals of the potentiometer. A contactor and one end terminal of potentiometer 30 are connected to the respective input terminals of a controller 17. Controller 17 is also provided with a reference set point signal 32 which is representative of the desired weight of the filled container. Controller 17 compares the reference signal with the measured signal and provides an output signal which is representative of any difference therebetween. Scale 25 is illustrated somewhat schematically in order to simplify the explanation of this invention. Any of several well known commercial scales can be employed to provide an output signal representative of the weight of the container. Similarly, controller 17 can be any type of controller which compares an input signal with a set point signal to provide an output difference signal.

Ice cream mix is introduced into freezer 10 through a conduit 33 which has an adjustable control valve 34 therein. Air is introduced into freezer 10 through a conduit 35 which has an adjustable control valve 36 therein. If the flow of mix is maintained at a uniform rate, the density of the product will be a function of the amount of air introduced into the freezer through conduit 35. This is controlled in accordance with the invention by applying the output signal from controller 17 to valve 36. If the weight of the filled container should tend to increase above the desired value, valve 36 is opened an additional amount to increase the amount of air added to freezer 10. Conversely, if the weight of the filled container decreases, valve 36 is closed to decrease the amount of air. In this manner, the weight of the filled containers can be maintained at a constant value. Controller 17 can be any suitable type of electrical or pneumatic controller which provides an output signal representative of the difference between the input signal and the set point. This controller can be provided with suitable integration means so that an average output signal is established which is not affected by momentary changes in weight as the containers are transferred on to and off of the scale.

Suitable control means for actuating the mechanism of FIGS. 1 and 2 is illustrated schematically in FIG. 4. A platform 40 is provided at filling station 13 to receive empty containers and to support these containers as they are being filled from nozzle 20. Platform 40 is connected by a rod 41 to a piston 42 which is enclosed within a chamber 43. The opposite ends of chamber 43 receives respective inlet conduits 44 and 45 which are selectively connected to an air inlet conduit 46 by a valve 47. Similarly, the two ends of chamber 43 are connected by respective outlet conduits 48 and 49 selectively to a vent conduit 50 by means of a valve 51. When air is introduced into chamber 43 through conduit 44, piston 42 is moved upwardly to elevate the container. When air is introduced into chamber 43 through conduit 45, piston 42 is moved downwardly to lower the container. As illustrated in FIG. 2, inlet conveyor 11 is located at a lower level than is platform 26 of the weighing station. Platform 40 initially is lowered to the level of conveyor 11 to receive an empty container from conveyor 11. When platform 40 is lowered to this position, a switch 53 is closed to connect a current source 54 to a solenoid 55. Solenoid 55 actuates pusher 12 to move an empty container from conveyor 11 to filling station 13. Pusher 12 is mechanically connected to a switch 56 so as to open this switch when the pusher reaches the end of its path. This deenergizes a solenoid 57 which is connected in circuit with a current source 58 by switch 56. Solenoid 57 controls valves 47 and 51 so that air is introduced through conduit 44 and is vented through conduit 49 when the solenoid is deenergized. This serves to move piston 42 upwardly and raise platform 40 to the position illustrated in FIG. 2. Ice cream from freezer 10 flows downwardly through nozzle 20 and tube 21 to fill the container then resting on platform 40. This continues until the container is filled, at which time tube 21 is telescoped into nozzle 20. When the container is filled, rod 24 closes switch 23 to energize a solenoid 60 which is connected in circuit with a current source 61. This actuates transfer member 14 to move the filled container on to scale 15. At the end of the rotation of member 14, a mechanical linkage serves to close switch 56 to energize solenoid 57. This reverses valves 47 and 51 so that air is introduced into the region above piston 42 to move platform 40 downwardly to receive a second container. These operations proceed quite rapidly so that there is no spillage of ice cream from nozzle 20 as containers are transferred.

In some operations, it is desirable to print the weight and/or other identification data on the filled containers. This can be accomplished by printer 18 which is also actuated by solenoid 60. A short time delay mechanism can be provided so that the container is displaced from the scale on to conveyor 16 to a location adjacent the printer by the time the printer is actuated. Recorder 19 can be actuated at the same time to provide a permanent record of the weight of the filled container.

In the illustrated embodiment of this invention, the density of the ice cream is varied by the amount of air introduced into freezer 10. As an alternative, the density can be controlled by maintaining the air flow at a uniform rate and regulating valve 34.

While the invention has been described in conjunction with the packaging of ice cream and similar products, it should be apparent that the principles of this invention are applicable to the packaging of any material in which the density of the product can be adjusted to maintain a predetermined weight of a fixed volume of the material. The term "ice cream" is used herein in a broad sense to designate both ice cream in the strict sense of the term as well as similar products made from vegetable materials in place of cream, "ice milk," sherbet and the like.

While the invention has been described in conjunction with a presently preferred embodiment, it should be evident that it is not limited thereto.

What is claimed is:

1. Manufacturing and packaging apparatus comprising:
   an ice cream freezer having first inlet means to receive ice cream mix and second inlet means to receive air;
   container filling apparatus positioned at a first location and connected to said ice cream freezer, said container filling apparatus being adapted to deliver a predetermined volume of ice cream sequentially to a series of containers to be filled;
   first conveyor means to move empty containers sequentially to said first location;
   container weighing means adapted to provide an output signal representative of the weight of a container being weighed;
   second conveyor means to move filled containers from said first location to said weighing means;
   third conveyor means to remove filled containers from said weighing means; and
   means responsive to the output signal of said weighing means to regulate the relative flows through said inlet means to said freezer to vary the density of the ice cream so that the weights of the filled containers remain substantially constant.

2. The apparatus of claim 1, further comprising recording means, and means to connect said output signal to said recording means.

3. The apparatus of claim 1, further comprising printing means positioned to print on containers removed from said weighing means, means to apply said output signal to said printing means, and means to actuate said printing means responsive to filled containers being moved adjacent said printing means.

References Cited
UNITED STATES PATENTS

| | | | |
|---|---|---|---|
| 1,578,591 | 3/1926 | Fear | 62—136X |
| 2,530,981 | 11/1950 | Mikina | 62—136X |
| 2,712,408 | 7/1955 | Weber | 177—56 |
| 2,720,353 | 10/1955 | Stirn et al. | 141—83X |
| 2,959,932 | 11/1960 | Spergel et al. | 99—137 |
| 3,064,697 | 11/1962 | Maione | 141—83 |
| 3,073,400 | 1/1963 | Bauder et al. | 141—83X |
| 3,151,775 | 10/1964 | Whitehead, Jr. | 222—57 |
| 3,306,495 | 2/1967 | Wabers | 222—77 |

TIM R. MILES, Primary Examiner

U.S. Cl. X.R.

99—180; 141—83; 222—77; 53—131; 177—56; 62—179, 136